United States Patent [19]

Cordoba-Molina et al.

[11] 4,417,988

[45] Nov. 29, 1983

[54] METHOD FOR IMPROVING SOLIDS REMOVAL IN CLARIFIERS

[76] Inventors: Jesus F. Cordoba-Molina, Div. de Fuentes de Energia, Inst. de Investigaciones Elec., Interior Internado Palmira, Apartada Postal 475, Cuernavaca, Morelos, Mexico; Robert R. Hudgins, 196 Bellehaven Ave.; Peter L. Silveston, 121 Allen St., both of Waterloo, Ontario, Canada

[21] Appl. No.: 266,733

[22] Filed: May 26, 1981

[51] Int. Cl.³ .............................................. B01D 21/00
[52] U.S. Cl. ..................................... 210/801; 210/802
[58] Field of Search ............... 210/776, 800, 801, 802, 210/803, 804

[56] References Cited

U.S. PATENT DOCUMENTS 3,899,427  8/1975  Connelly et al. ................... 210/802
4,116,789  9/1978  King ................................... 210/802

OTHER PUBLICATIONS

Parker, Homer W., Wastewater Systems Engineering, Prentice-Hall, Inc., N.J., 1975, pp. 138-151.
Foust, Alan S., et al., Principles of Unit Operations, John Wiley and Sons, Inc., 1970, pp. 416, 475-477.

*Primary Examiner*—David R. Sadowski
*Attorney, Agent, or Firm*—Sim & McBurney

[57] ABSTRACT

The efficiency of clarifiers is improved by providing a contraction adjacent the outlet which accelerates the liquid to a densimetric Froude number at the contraction of at least $0.1/\pi$. The contraction dampens internal waves in the fluid and improves the uniformity of flow of fluid through the tank.

7 Claims, 6 Drawing Figures

FIG. 4.b.

METHOD FOR IMPROVING SOLIDS REMOVAL IN CLARIFIERS

FIELD OF INVENTION

The present invention relates to the removal of solids from liquids in rectangular, square or circular vessels, known as clarifiers or sedimentation basins.

BACKGROUND TO THE INVENTION

In clarifier operation, solids initially found in the fluid entering the vessel settle under the influence of gravity to the vessel floor and clarified fluid flows out of the tank through ports or overflow devices. The dense solids are collected, such as, by the use of moving rakes, and removed as a sludge.

The degree of removal of solids in a basin depends on the settling velocity of the solids in a quiescent fluid, basin dimensions and the flow rate of fluid containing the settleable suspension through the clarifier. Clarifiers, however, even when equipped with inlet baffles to prevent short circuiting, provide appreciably less than ideal removal of solids from liquids and, to date, no satisfactory explanation of this phenomenon has been forthcoming nor has the solids removal been significantly improved.

SUMMARY OF INVENTION

It has now surprisingly been found that the poor performance of conventional clarifiers is caused by internal waves in the basin which, in turn, induce mixing in the tank and inhibit settling. In accordance with the present invention, separation of solids from the liquid is significantly improved by the utilization of flow contractions adjacent to the clarifier outlet which suppress the internal waves and tend to promote more uniform flow in the clarifier basin. Alternatively, the overall clarifier capacity may be significantly improved for the same separation efficiency, by the present invention.

The invention is applicable to both flocculating and non-flocculating solids. In the latter case, a mixing chamber to promote flocculation is provided at the entrance to the clarifier or in a separate upstream vessel.

The configurations of the flow contractions are determined by the densimetric Froude number of the fluid at the exit. The densimetric Froude number is the ratio of momentum to gravitational forces and for stratified flow, such as encountered in clarifiers. The densimetric Froude number (F) is determined by the equation:

$$F = \frac{V}{\sqrt{(g\Delta\rho/\rho)h}}$$

wherein V is the horizontal velocity of liquid in the clarifier, h is the depth of liquid in the clarifier, (the latter parameters being determined at the clarifier exit in the absence of a contraction or at a location immediately prior to commencement of the contraction), g is the acceleration due to gravity, $\Delta\rho$ is the density difference between that of the feed and that of the overflow from the clarifier and $\rho$ is the average density of the fluid in the tank, namely the average value of the density of the feed and that of the overflow. As an approximation, the density of clear water can usually be used in place of the density of the overflow.

The flow contractions are provided in a geometric form which provides a flow velocity at the minimum cross-sectional area of the contraction corresponding to the relationship:

$$F \geq \frac{0.1}{\pi} \text{ and preferably } \geq \frac{1}{\pi}$$

and preferably $\geq 1/\pi$ when constructed in this way, the contractions act as a sink for most internal waves. Since most internal waves are absorbed and not reflected or propagated, the mixing which results from such waves in a conventional clarifier is decreased, and the degree of settling achieved is substantially improved. Further, the contractions provide uniform withdrawal of fluid from the clarifier, thereby preventing the mixing of the clarifier contents by preferential withdrawal from the surface and the shearing force which results thereby.

The flow contractions which produce the beneficial results of the invention may be in the form of add-on structures to conventionally-constructed clarifiers or may be built into clarifiers especially constructed in accordance with the principles of the invention.

BRIEF DESCRIPTION OF DRAWINGS

FIGS. 4a and 4b are respectively, a plan view and an elevational view of a circular sedimentation tank modified in accordance with a fourth embodiment of the invention.

DESCRIPTION OF PREFERRED EMBODIMENTS

Figure 1:
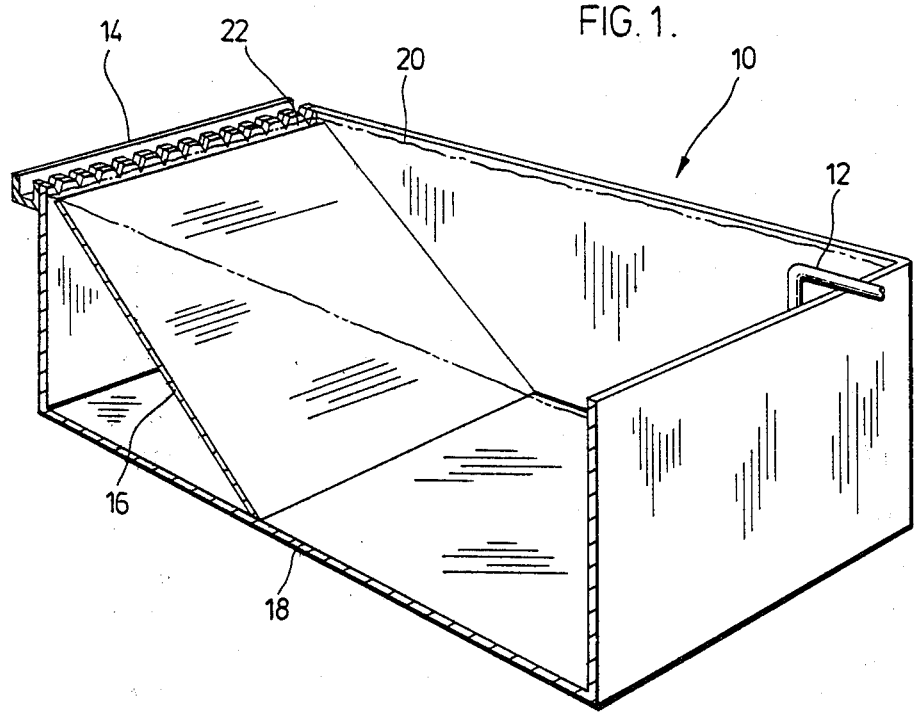
FIG. 1 is a perspective view of a rectangular sedimentation tank modified in accordance with a first embodiment of the invention.
Figure 2:
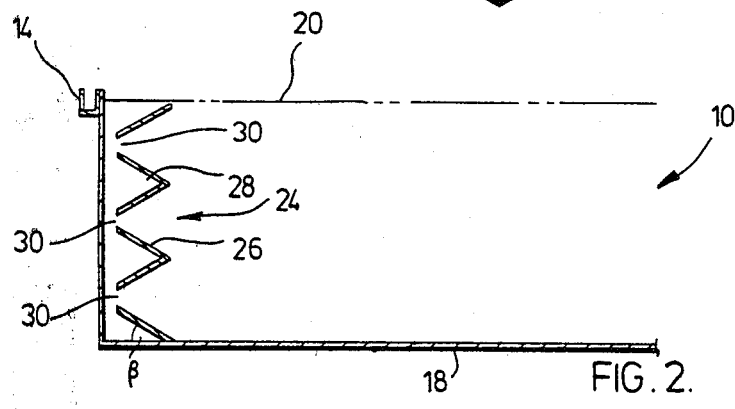
FIG. 2 is an elevational view of the outflow end of a rectangular sedimentation tank modified in accordance with a second embodiment of the invention.
Figure 3:
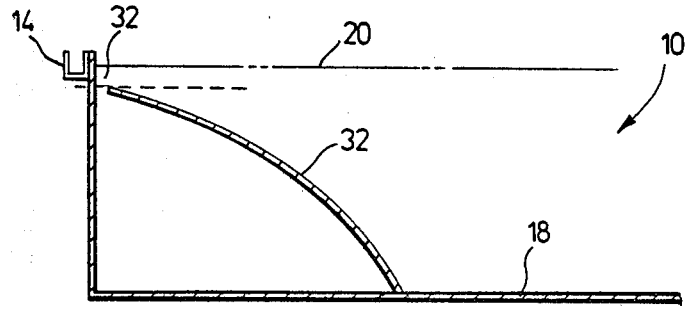
FIG. 3 is an elevational view of the outflow end of a rectangular sedimentation tank modified in accordance with a third embodiment of the invention.

Referring first to FIGS. 1 to 3, there is illustrated therein a conventional rectangular sedimentation tank 10 having an inlet 12 at one longitudinal end thereof for liquid to be clarified and an external saw-toothed overflow weir outlet 14 at the opposite longitudinal end thereof for removal of clarified liquid from the tank 10. The weir 14 may be of any other convenient form and may be located within the tank, if desired.

The modification to this conventional sedimentation tank 10 provided in accordance with the embodiment of FIG. 1 is the location of a flat plate 16 in the tank 10 extending across the width thereof and extending upwardly from the base 18 of the tank 10 towards the outlet 14 at an angle α to the base 18. The flat plate 16 terminates at its upper end a short distance below the free surface 20 of liquid in the clarifier 10 to define a gap 22 therebetween through which the clarified liquid flows to the outlet 14.

The gap 22 constitutes a contraction and is dimensioned to maintain a densimetric Froude number equal to or greater than $0.1/\pi$, preferably greater than $1/\pi$, therein at the lowest intended flow rate of liquid to the clarifier 10. The value of the angle α may vary widely, usually in the range of about 15° to about 60°, typically about 30°.

In FIG. 2, the modification to the conventional rectangular clarifier tank 10 comprises a series of plates 24 extending across the width of the clarifier tank 10 adjacent the outlet 14 and extending from the free liquid surface 20 to the base 18 of the tank 10. The series of plates 24 comprising alternately-directed plates 26 which subtend angles of $\beta°$ and $-\beta°$ to the base 18, form saw-tooth-like pairs 28 and define slits 30 therebetween at their downstream vertices.

The slits 30 constitute contractions and are dimensioned to maintain a densimetric Froude number equal to or greater than $0.1/\pi$, preferably greater than $1/\pi$, therein at the lowest intended flow rate of liquid into the clarifier 10. The number of such slits 30 depends on the dimensions of the tank 10, in particular the depth thereof, and the value of the angle $\beta$. The value of the angle $\beta$ may vary widely, usually in the range of about 15° to about 60°, typically about 30°.

FIG. 3 illustrates a further embodiment of the invention, wherein a concavely curved plate 32 which extends across the width of the tank 10 is positioned extending from the base 18 to adjacent the outlet 14. The curved plate 32 is spaced at its upper end from the free surface 20 of liquid in the tank 10 by a gap 32 through which the clarified liquid flows to the outlet 14.

The curved plate 32 subtends an angle $\gamma$ with the base 18 at the lower end and an angle $\delta$ at its upper end with respect to a plane parallel to the base 18. The value of the angle $\gamma$ usually is greater than the value of the angle $\delta$, the former angle usually varying from about 45° to about 75°, typically about 60° and the latter angle usually varying from about 15° to about 45°, typically about 30°.

The gap 32 constitutes a contraction and is dimensioned to maintain a densimetric Froude number equal to or greater than $0.1/\pi$, preferably greater than $1/\pi$, therein at the lowest intended flow rate of liquid into the clarifier.

A clarifier tank 10, modified in the manner described above with respect to FIGS. 1 to 3, increases the fractional removal of solids from the inflowing liquid, which, in turn, at the same fractional removal level, increases the overall capacity of the clarifier. These results are achieved even though the actual overall volume of the clarifier is decreased by the presence of the physical elements which form the contraction.

The embodiments of FIGS. 1 to 3 represent add-on devices to an existing conventional rectangular clarifier. The same results are obtained if the clarifier is constructed with the contraction built in by providing clarifier walls which are suitably contoured.

Figure 4A:
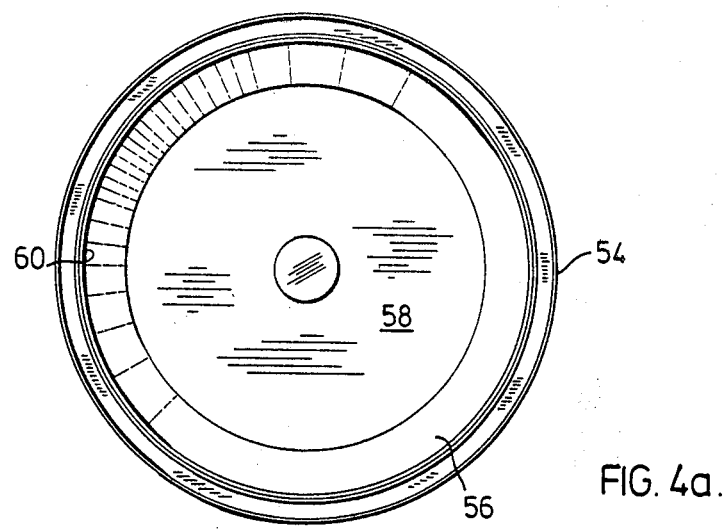

Turning now to FIG. 4, this Figure illustrates the application of the invention to a circular clarifier 50 constructed in accordance with the invention. The circular clarifier 50 has an axially-located inlet 52 and a perimetrically-extending weir outlet 54. The clarifier 50 is provided in frusto-conical form, with an annular wall 56 extending between the base 58 and the outlet 54 at an angle of $\omega$ to the base 58. The annular wall 56 at its upper end terminates below the free surface of the liquid in the clarifier and defines a gap 60 through which the clarified liquid passes.

The gap 60 constitutes a contraction and is dimensioned to maintain a densimetric Froude number equal to or greater than $0.1/\pi$, preferably greater than $1/\pi$, therein at the lowest intended flow rate of liquid into the clarifier 10. The value of the angle $\omega$ may vary widely, usually in the range of about 15° to about 60°, typically about 30°.

As in the case of the modified rectangular clarifier tank, the fractional removal of solids by the circular clarifier 50 is improved by modifying the structure as described above. Additionally, for the same fractional removal, the overall capacity of the clarifier 50 is improved in the modified design.

In place of the specially-formed frusto-conical shape of the clarifier 50, a conventional circular clarifier with right cylindrical walls may be modified by positioning a baffle within the clarifier equivalent to the annular wall 56.

Figure 5:
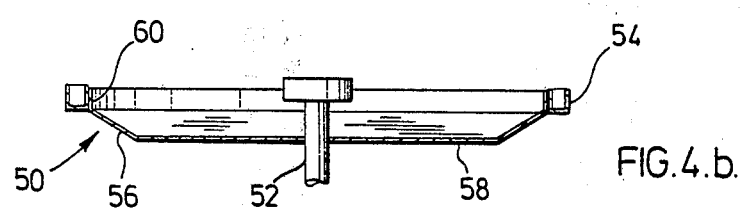
FIG. 5 is a plan view of a square sedimentation tank modified in accordance with a fifth embodiment of the invention.
Figure 5:
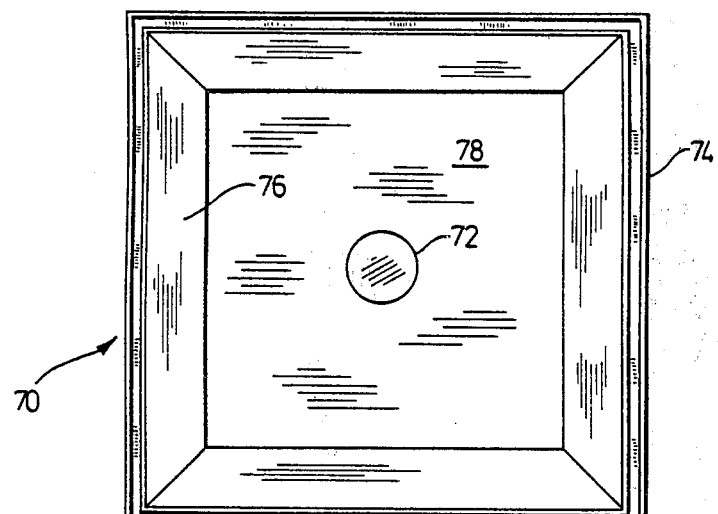

FIG. 5 illustrates a square clarifier 70 constructed in accordance with this invention and having a central inlet 72 and a perimetrically-extending outlet 74 to obtain improved clarifier operation. The side walls 76 extend angularly upwardly from the base 78 to the outlet 74 to define a gap between the upper extremity thereof and the liquid level in the tank 70. This gap constitutes a contraction through which the clarified liquid passes to the outlet 74. The contraction is dimensioned to provide a densimetric Froude number equal to or greater than $0.1/\pi$ preferably greater than $1/\pi$, therein at the lowest intended flow rate of liquid in the clarifier 70.

EXAMPLES

Example 1

A rectangular clarifier tank of the type illustrated in FIG. 1 was constructed with dimensions of 5½ ft. long, 16 in. wide and 12 in. deep. The clarifier was provided with an inlet baffle and a 90° V-notch weir outlet. The plate 16 extended at an angle of 30° to the bottom wall 18 of the clarifier and terminated just upstream of the outlet weir and ½ in. below the free surface of liquid in the clarifier.

The latter spacing corresponds to a densimetric Froude number greater than $1/\pi$ for flow rates in excess of 2 USG/min. A series of experiments was carried out using different flow rates corresponding to hydraulic loadings of 370 to 1040 USG/day-ft$^2$ and differing concentrations of suspended solids over the range of 1000 to 5000 mg/l. As compared with the same clarifier without the plate 16, the fractional removal of solids was found to increase by from 4% to 10%, in terms of overall total solids removal and, at the same fractional removal level, the capacity of the clarifier was found to increase by from 20 to 80%. These results were obtained even though the presence of the plate 16 decreased the overall volume of the clarifier tank by about 20%.

EXAMPLE 2

A circular clarifier tank of the type illustrated in FIG. 4 was constructed with an open top radius of 6.12 m, a bottom wall radius of 4.42 m, and an overall height of 0.153 m. A series of experiments was carried out at overflow rates from 22 to 31 cu.m/day-sq.m over a suspended solids concentration range of 950 to 4500 mg/l. As compared with a conventionally constructed circular clarifier, i.e., one in which the clarifier is of right-cylindrical shape, the fractional removal of solids was found to increase by from 2 to 9% (average 6%), in terms of overall solids removal.

SUMMARY OF DISCLOSURE

In summary of this disclosure, the present invention provides method and apparatus for improving the settling characteristics of clarifiers by dampening internal waves in the settling fluid and by promoting uniform withdrawal of fluid from the vessel. The fluid rate of liquid through the clarifier is increased just before the liquid leaves the clarifier by the use of a contraction to a critical value. Modifications are possible within the scope of this invention.

What we claim is:

1. A method of improving the settleability of a suspension of solid particles in water flowing through a settling zone from an inlet thereto to an outlet therefrom, which comprises:

flowing a suspension of solid particles in water through said settling zone from said inlet thereto towards said outlet thereof at a flow rate which permits settling of said solid particles in said settling zone, and decreasing the effective depth of said settling zone towards said outlet to effect acceleration of the flow of said suspension towards said outlet to achieve a densimetric Froude number of the suspension of at least $0.1/\pi$ at the point of maximum velocity of said suspension and minimum volume of said settling zone, said densimetric Froude number (F) being determined by the relationship:

$$F = \frac{V}{\sqrt{(g\Delta\rho/\rho)h}}$$

wherein V is the horizontal velocity of liquid at a point in the settling zone and h is the depth of liquid in the settling zone at the same point, g is the acceleration due to gravity, $\Delta\rho$ is the density difference between that of the feed to and that of the overflow from the settling zone and $\rho$ is the average density of said suspension in said settling zone.

2. The method of claim 1 wherein said Froude number is at least $1/\pi$.

3. The method of claim 1 wherein said effective depth decrease is effected by decreasing the distance between the surface of said suspension and the base of said settling zone towards said outlet.

4. The method of claim 1 wherein said effective depth decrease is effected by dividing said settling zone into a plurality of individual vertically aligned zones and decreasing the depth of each said individual zones towards said outlet.

5. The method of claim 1 wherein said settling zone is rectangular in plan, has said inlet at one longitudinal end thereof and has said outlet at the other longitudinal end thereof.

6. The method of claim 1 wherein said settling zone is cylindrical or square in plan view, has said inlet centrally located and has said outlet peripherally located.

7. The method claimed in claim 1 wherein said decreasing of the effective depth of the settling zone towards said outlet is effected by positioning a surface in said settling zone extending upwardly from a base surface of the settling zone towards said outlet at an angle of about 15° to about 60° with respect to the base surface.

* * * * *